(12) United States Patent
Hagiwara

(10) Patent No.: US 12,025,227 B2
(45) Date of Patent: Jul. 2, 2024

(54) GASKET

(71) Applicant: NOK CORPORATION, Tokyo (JP)

(72) Inventor: Naoki Hagiwara, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 132 days.

(21) Appl. No.: 17/289,825

(22) PCT Filed: Nov. 27, 2019

(86) PCT No.: PCT/JP2019/046333
§ 371 (c)(1),
(2) Date: Apr. 29, 2021

(87) PCT Pub. No.: WO2020/152978
PCT Pub. Date: Jul. 30, 2020

(65) Prior Publication Data
US 2021/0396316 A1    Dec. 23, 2021

(30) Foreign Application Priority Data
Jan. 23, 2019   (JP) .................................. 2019-009633

(51) Int. Cl.
*F16J 15/10*    (2006.01)
*F16J 15/12*    (2006.01)

(52) U.S. Cl.
CPC ........... *F16J 15/104* (2013.01); *F16J 15/121* (2013.01)

(58) Field of Classification Search
CPC ........... F16J 15/121; F16J 15/104; F16J 15/12
See application file for complete search history.

(56) References Cited

U.S. PATENT DOCUMENTS 2,764,311 A * 9/1956 Blackman .............. F16J 15/121
  277/649
3,346,266 A * 10/1967 Bondroit ................ F16J 15/121
  277/601

(Continued)

FOREIGN PATENT DOCUMENTS

CN      103511699      1/2014
CN      106133413      11/2016

(Continued)

OTHER PUBLICATIONS

1 Extended European Search Report issued in European Patent Application No. 19911625.2 dated Sep. 15, 2022.
Written Opinion of the International Search Authority received in International Application No. PCT/JP2019/046333, dated Jan. 7, 2020, and English language translation thereof.
Notice of Reasons for Refusal received in JP application No. 2020-535155, dated Jul. 14, 2021 and English language translation thereof.

(Continued)

*Primary Examiner* — Eugene G Byrd
(74) *Attorney, Agent, or Firm* — GREENBLUM & BERNSTEIN, P.L.C.

(57) ABSTRACT

A gasket includes an annular reinforcing ring formed around an axis, an annular base that is formed around the axis and that is formed from an elastic body into which the reinforcing ring is embedded, and an annular seal lip formed around the axis. The annular seal lip is disposed on an inner periphery side of the base and is integrated with the base. The seal lip includes one lip portion extending to the inner periphery side as progress toward one side in a direction of the axis and another seal lip portion extending to the inner periphery side as progress toward another side in the axis direction. A sum of a width of the base in a radial direction and a width of the seal lip in the radial direction is greater than a thickness of the base in the axis direction.

8 Claims, 9 Drawing Sheets

(56) References Cited

U.S. PATENT DOCUMENTS

| | | | | |
|---|---|---|---|---|
| 3,445,120 | A | * | 5/1969 | Barr ................. F16J 15/121 277/618 |
| 3,512,789 | A | * | 5/1970 | Tanner ............... F16J 15/164 277/647 |
| 3,720,420 | A | * | 3/1973 | Jelinek .............. F16J 15/104 277/611 |
| 3,726,178 | A | * | 4/1973 | Dimitry ............. F16B 43/001 277/637 |
| 3,775,832 | A | * | 12/1973 | Werra ............... F16J 15/104 277/614 |
| 4,310,165 | A | | 1/1982 | Martin et al. |
| 4,634,132 | A | * | 1/1987 | Jelinek .............. F16J 15/104 277/630 |
| 5,409,337 | A | * | 4/1995 | Muyskens ........... F16J 15/121 285/379 |
| 8,419,021 | B2 | * | 4/2013 | Mellander .......... F16J 15/061 277/567 |
| 10,608,260 | B2 | * | 3/2020 | Horimoto ........... B29C 45/14 |
| 10,612,660 | B2 | * | 4/2020 | Yanagi .............. F16J 15/125 |
| 2004/0135322 | A1 | * | 7/2004 | Weisbrodt .......... F16J 15/104 277/608 |
| 2004/0160018 | A1 | * | 8/2004 | Dupont ............. F16J 15/062 277/628 |
| 2007/0210528 | A1 | * | 9/2007 | Baber ............... F16J 15/104 277/549 |
| 2015/0152990 | A1 | * | 6/2015 | Lopez-Chaves .... F16L 37/0845 277/609 |
| 2017/0089465 | A1 | | 3/2017 | Yanagi |
| 2017/0321831 | A1 | * | 11/2017 | Nahrwold ........... F16L 23/18 |

FOREIGN PATENT DOCUMENTS

| | | | |
|---|---|---|---|
| JP | S50-90947 U | 7/1975 | |
| JP | S55-78858 A | 6/1980 | |
| JP | H5-47619 U | 6/1993 | |
| JP | H5-52438 U | 7/1993 | |
| JP | 7-91551 A | 4/1995 | |
| JP | H7-269711 A | 10/1995 | |
| JP | 2012021640 A * | 2/2012 | ............. F16J 15/104 |
| JP | 2012-67790 | 4/2012 | |
| JP | 2012-77877 A | 4/2012 | |
| WO | WO 2015/137491 A1 | 9/2015 | |
| WO | WO-2017135337 A1 * | 8/2017 | ............. F16J 15/104 |

OTHER PUBLICATIONS

ISR for PCT/JP2019/046333, dated Jan. 7, 2020.
Office Action for JP App. No. 2020-535155, dated Apr. 5, 2021 (w/ translation).
Japan Decision of Refusal received in JP application No. 2020-535155, dated Oct. 4, 2021.
China Office Action received in CN Application No. 201980068603.6, dated Nov. 4, 2022.
China Office Action issued in CN application No. 201980068603.6, dated May 31, 2023.
China Office Action issued in CN application No. 201980068603.6, dated Mar. 10, 2023.

* cited by examiner

GASKET

CROSS REFERENCE TO RELATED APPLICATIONS

The present application is a national stage application of International Patent Application No. PCT/JP2019/046333 filed on Nov. 27, 2019, which claims the benefit of Japanese Patent Application No. 2019-009633, filed on Jan. 23, 2019. The contents of these applications are incorporated herein by reference in their entirety.

TECHNICAL FIELD

The present disclosure relates to a gasket.

BACKGROUND ART

Conventionally, gaskets into which an annular reinforcing ring formed around an axis and a gasket body are molded and integrated have been widely used. Such a gasket, for example, includes at least two seal lips configured to be in contact with one member, a member of a sealed object on one side, and another member, a member of the sealed object on another side, respectively. The gasket is disposed between the one member and the other member of the sealed object (for example, see Japanese Patent Application Publication No. HEI07-269711.

SUMMARY OF DISCLOSURE

Technical Problem

The gasket is disposed in an accommodating part formed between the one member and the other member of the sealed object, and a depth of the accommodating part varies widely due to manufacturing in some cases. In such a case, when width by which the gasket is compressed increases in response to a decrease in the depth of the accommodating part for the gasket, the gasket is excessively compressed. Thus, there is room for further improvement in durability of the gasket. In other words, a reduction of variation in width by which the gasket is compressed due to excessive compression can contribute to a further improvement in the durability of the gasket. In this way, the conventional gasket has been required to have a structure that allows the gasket to display further improved durability even if width by which the gasket is compressed increases.

In view of the challenge described above, it is an object of the present disclosure to provide a gasket that displays further improved durability even if width by which the gasket is compressed increases.

Solution to Problem

A gasket according to the present disclosure, accomplished to attain the object described above, is including: an annular reinforcing ring formed around an axis; an annular base that is formed around the axis and that is formed from an elastic body into which the reinforcing ring is embedded; and an annular seal lip formed around the axis, the annular seal lip being disposed on an inner periphery side of the base and being integrated with the base, wherein the seal lip includes one seal lip portion extending to the inner periphery side as progress toward one side in a direction of the axis and another seal lip portion extending to the inner periphery side as progress toward another side in the direction of the axis, and wherein a sum of a width of the base in a radial direction and a width of the seal lip in the radial direction is greater than a thickness of the base in the direction of the axis.

In the gasket according to one aspect of the present disclosure, a width of the reinforcing ring in the radial direction is a width equal to the width of the seal lip in the radial direction.

In the gasket according to one aspect of the present disclosure, the reinforcing ring is buried in a substantially middle part of the base in the direction of the axis.

In the gasket according to one aspect of the present disclosure, a reinforcing-ring hold-down hole is formed in the base to dispose the reinforcing ring in the substantially middle part of the base in the direction of the axis.

In the gasket according to one aspect of the present disclosure, the base has an outer peripheral lip protruding to an outer periphery side from an outer peripheral area of the base at the substantially middle part of the base in the direction of the axis.

Effects of Disclosure

The gasket according to the present disclosure displays further improved durability even if width by which the gasket is compressed increases.

DESCRIPTION OF EMBODIMENT

Hereinafter, an embodiment of the present disclosure is described with reference to the drawings.

Figure 1:
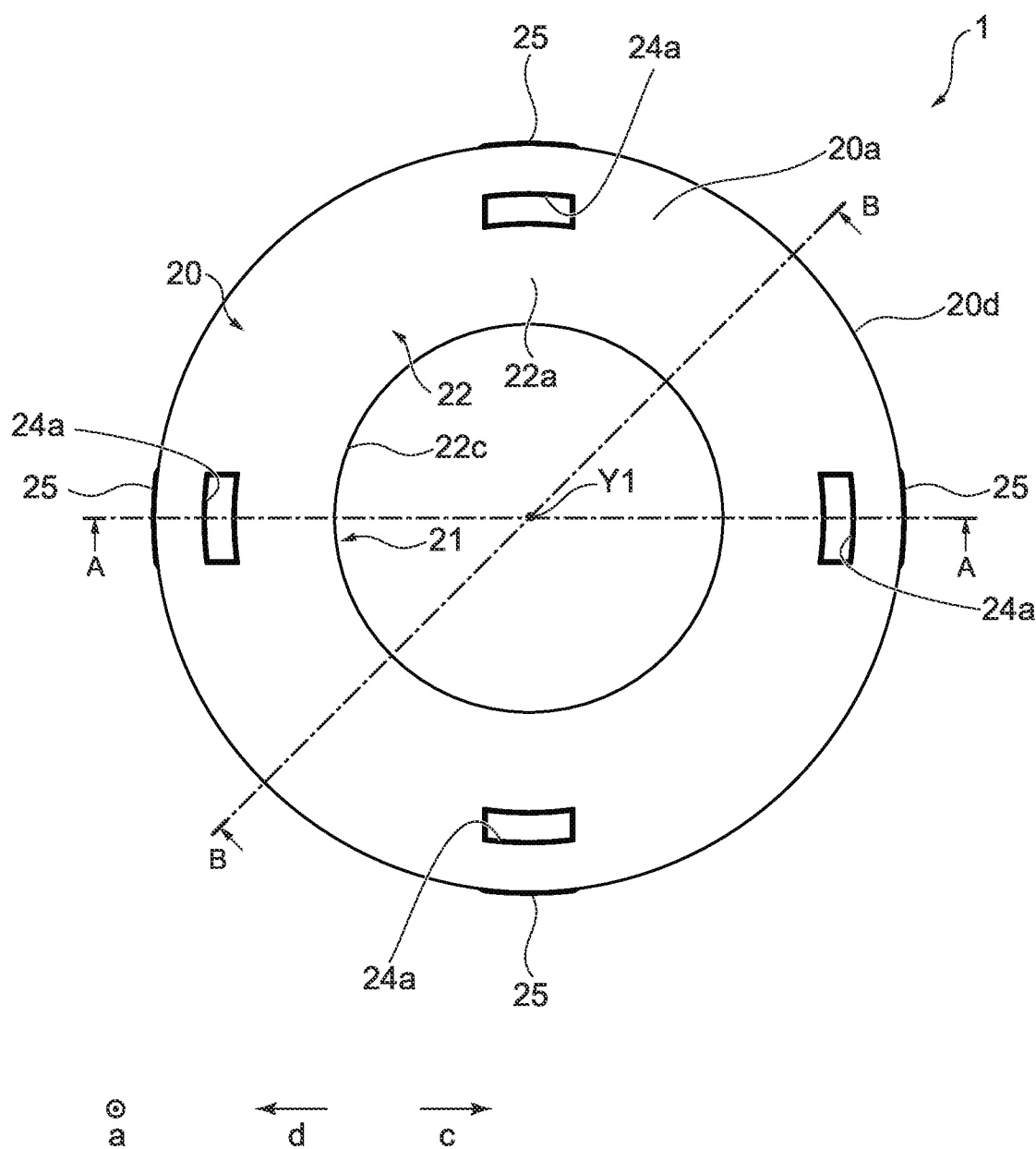
FIG. 1 is a schematic plan view illustrating a configuration of a gasket according to an embodiment of the present disclosure
Figure 2:
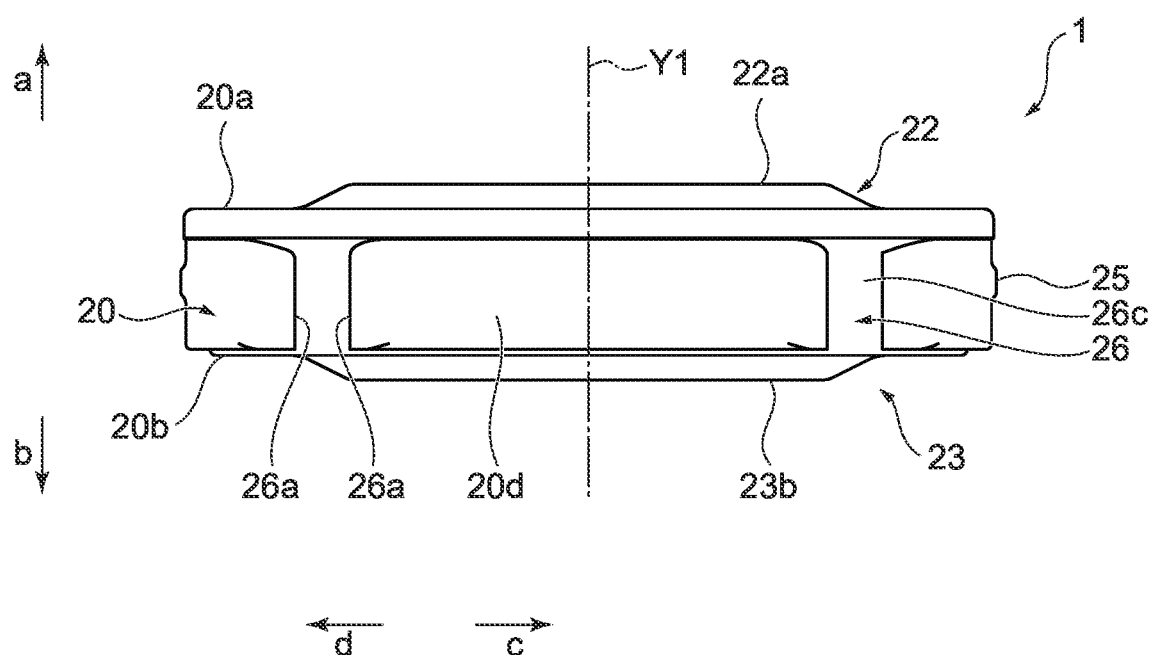
FIG. 2 is a schematic elevation view illustrating a configuration of a gasket according to an embodiment of the present disclosure
Figure 3:
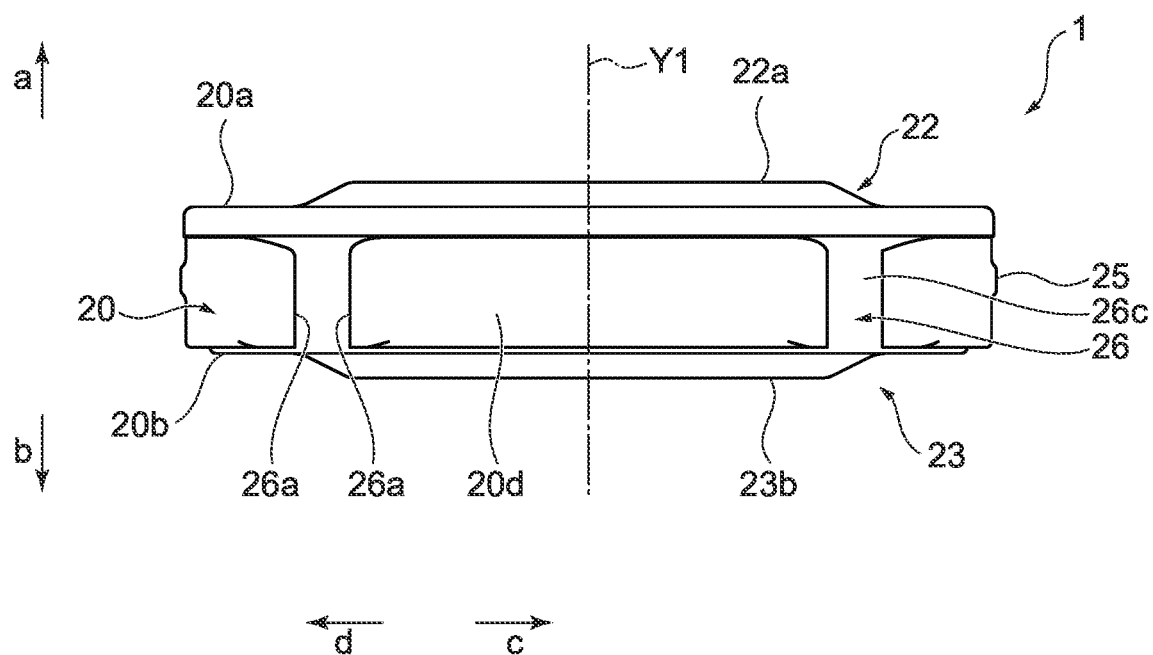
FIG. 3 is a schematic back elevation view illustrating a configuration of a gasket according to an embodiment of the present disclosure
Figure 4:
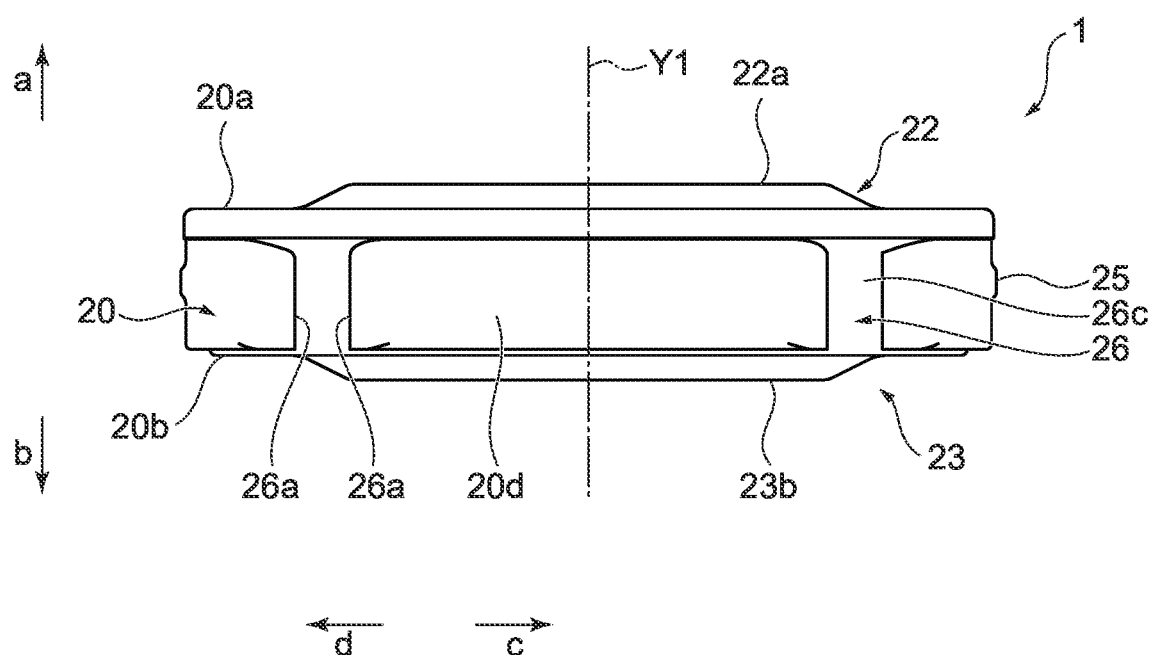
FIG. 4 is a schematic left side view illustrating a configuration of a gasket according to an embodiment of the present disclosure
Figure 5:
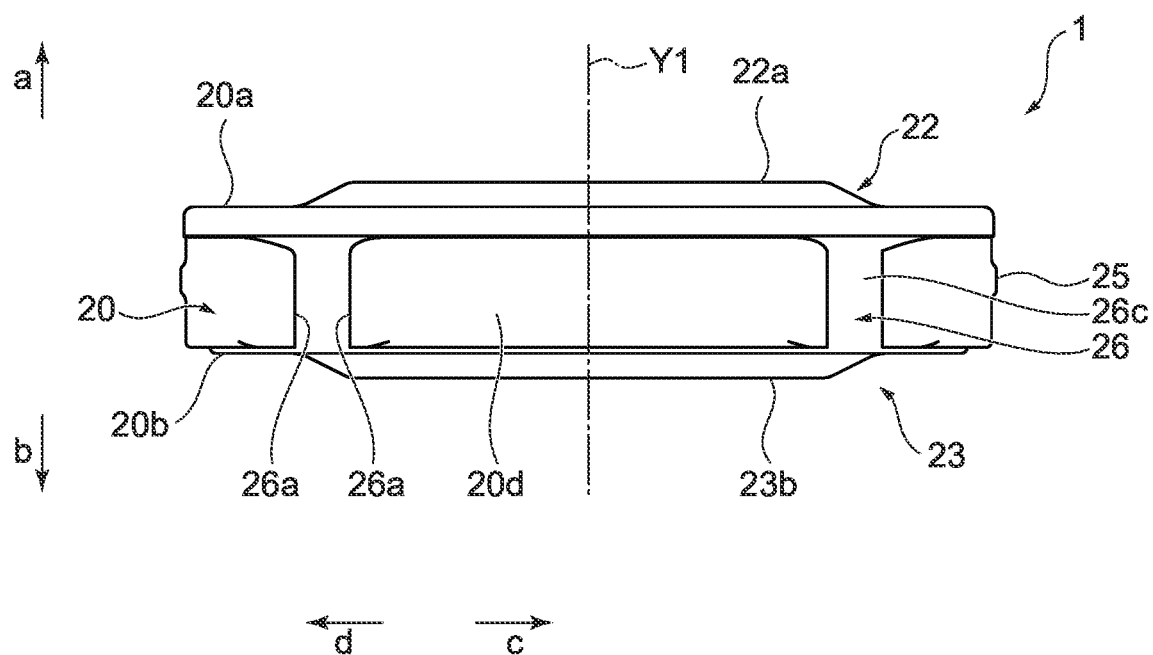
FIG. 5 is a schematic right side view illustrating a configuration of a gasket according to an embodiment of the present disclosure
Figure 6:
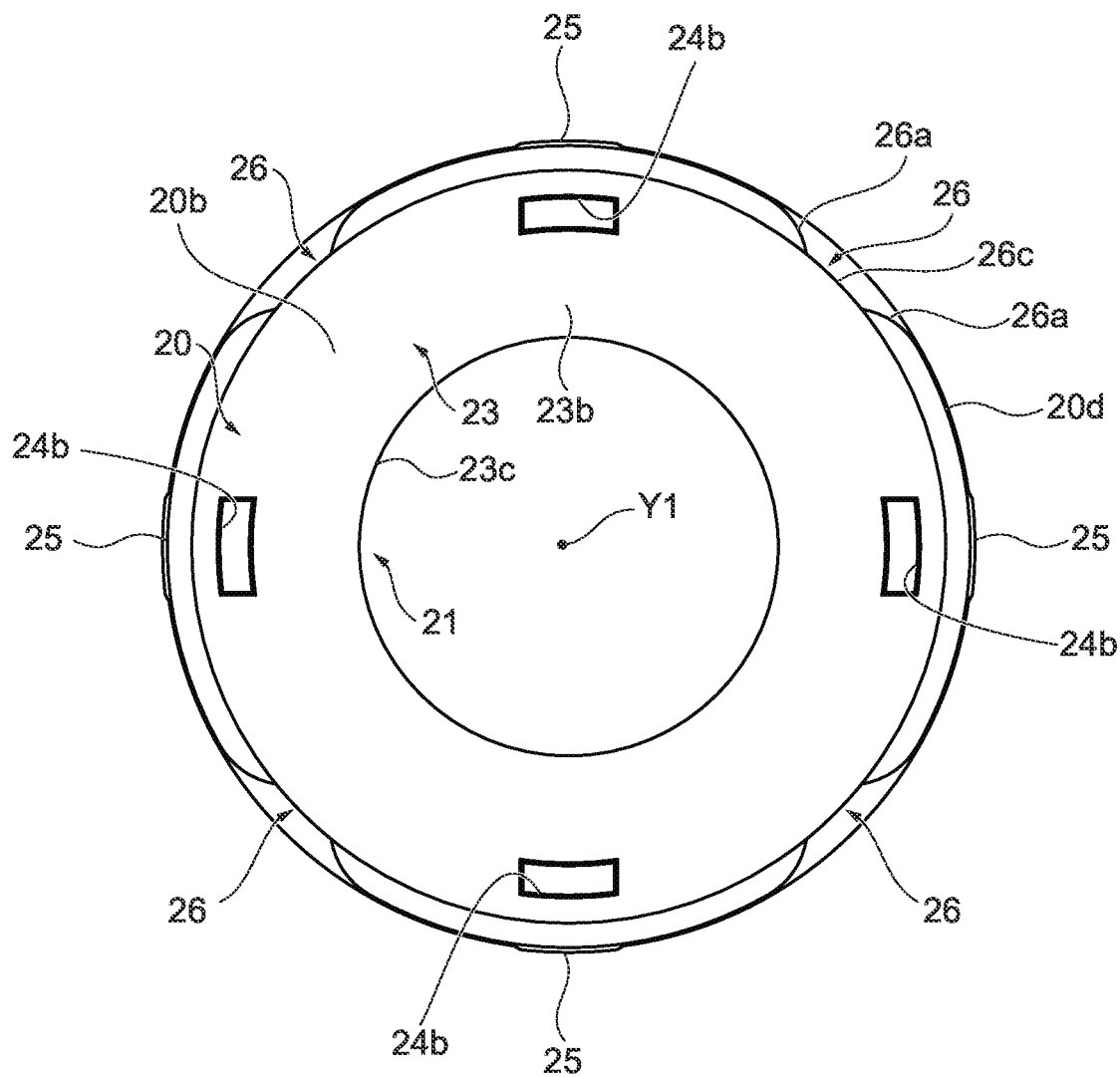
FIG. 6 is a schematic bottom view illustrating a configuration of a gasket according to an embodiment of the present disclosure
Figure 7:
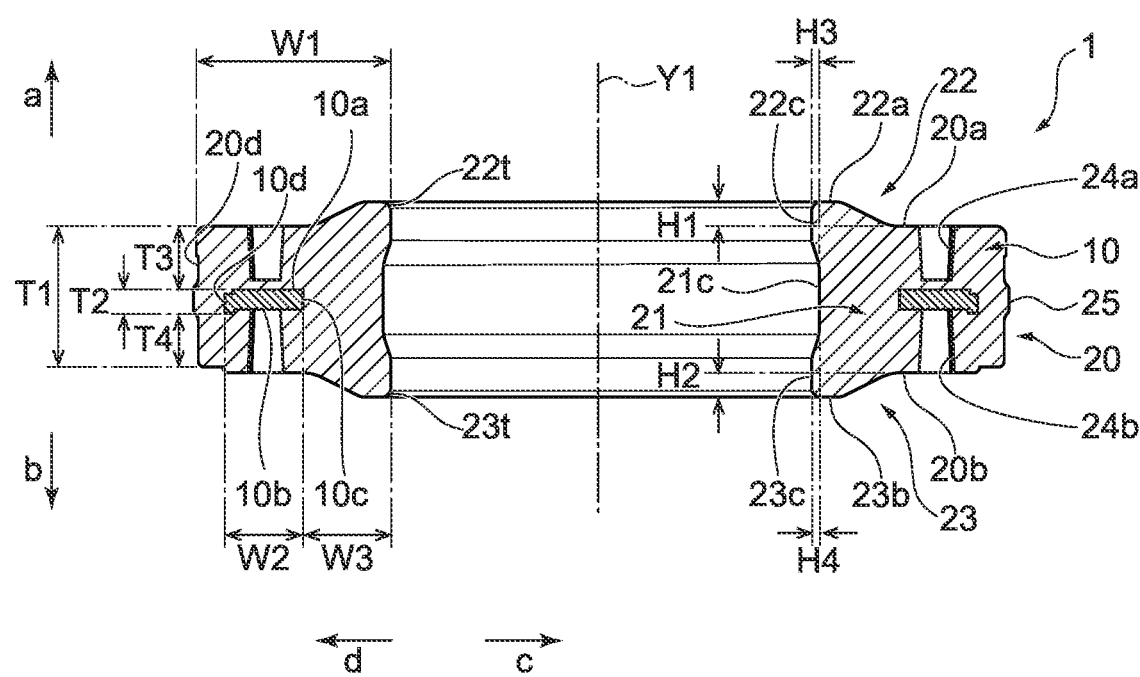
FIG. 7 is a cross-sectional view of a gasket according to an embodiment of the present disclosure, viewed along arrows A,A in FIG. 1
Figure 8:
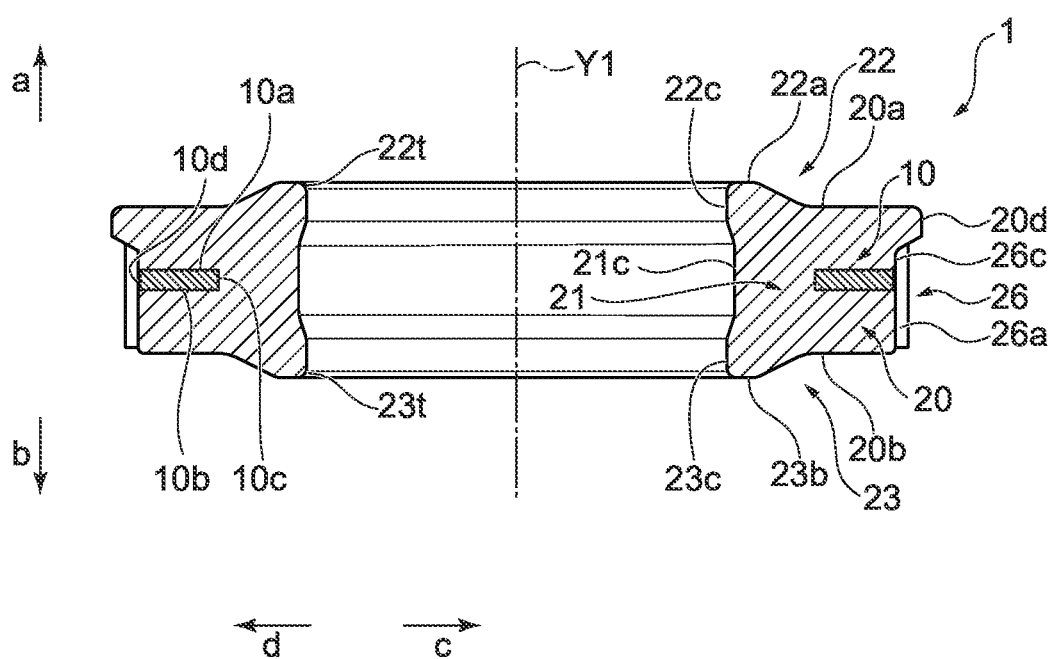
FIG. 8 is a cross-sectional view of a gasket according to an embodiment of the present disclosure, viewed along arrows B,B in FIG. 1

FIG. 1 is a schematic plan view illustrating a configuration of a gasket 1 according to an embodiment of the present disclosure, and FIG. 2 is a schematic elevation view illustrating the configuration of the gasket 1. FIG. 3 is a schematic back elevation view illustrating the configuration of the gasket 1, and FIG. 4 is a schematic left side view illustrating the configuration of the gasket 1. FIG. 5 is a schematic right side view illustrating the configuration of the gasket 1, and FIG. 6 is a schematic bottom view illustrating the configuration of the gasket 1. FIG. 7 is a cross-sectional view of a gasket according to an embodiment of the present disclosure, viewed along arrows A,A in FIG. 1, and FIG. 8 is a cross-sectional view of a gasket according to an embodiment of the present disclosure, viewed along arrows B,B in FIG. 1. The back elevation view, the left side view, and the right side view appear identical to the elevation view.

Hereinafter, in a direction of an axis Y1, an axis of the gasket 1, in FIGS. 1 to 8 (hereinafter also referred to as an "axis Y1 direction"), one side (a direction directed by an arrow a) represents an upper side and another side (a direction directed by an arrow b) represents a lower side, for convenience of explanation. In a radial direction of the gasket 1 extending so as to be orthogonal to the axis Y1 in FIGS. 1 to 8, one side (a direction directed by an arrow c) represents an inner periphery side and another side (a direction directed by an arrow d) represents an outer periphery side. In the following description, descriptions given of positional relationships and directions between members using up or down provide positional relationships and directions merely in the figures and do not provide positional relationships and directions between members installed in actual objects such as vehicles.

The gasket 1 according to the embodiment of the present disclosure serves to seal a gap near a flow path of different kinds such as a coolant passage in an exhaust gas recirculation (EGR) system used in automobiles and other vehicles, for example. The range of objects to which the gasket 1 according to the embodiment of the present disclosure is applied is not limited to the examples described above.

The gasket 1 according to the embodiment of the present disclosure includes an annular reinforcing ring 10 formed around the axis Y1, an annular base 20 that is formed around the axis Y1 and that is formed from an elastic body into which the reinforcing ring 10 is embedded, and an annular seal lip 21 formed around the axis Y1, the annular seal lip 21 being disposed on the inner periphery side (the arrow c direction) of the base 20 and being integrated with the base 20.

The seal lip 21 includes an upper seal lip portion 22 as one seal lip portion extending to the inner periphery side as progress toward the one side (the upper side (the arrow a direction)) in the axis Y1 direction and a lower seal lip portion 23 as another seal lip portion extending to the inner periphery side as progress toward the other side (the lower side (the arrow b direction)) in the axis Y1 direction. A sum of a width of the base 20 in the radial direction (the arrows cd direction) and a width of the seal lip 21 in the radial direction is greater than a thickness of the base 20 in the axis Y1 direction. Hereinafter, a configuration of the gasket 1 will be described in detail.

In the gasket 1, the elastic body is, for example, a rubber material such as fluororubber or acrylic rubber. The reinforcing ring 10 is made of metal and is manufactured by press working or forging, for example. An elastic body part (the base 20 and the seal lip 21) is molded with a mold by cross-linking (vulcanization). During the cross-linking, the reinforcing ring 10 is placed in the mold, the elastic body part (the base 20 and the seal lip 21) is bonded to the reinforcing ring 10 by cross-linking bonding, and the elastic body part (the base 20 and the seal lip 21) is integrally molded with the reinforcing ring 10.

An external shape of the gasket 1 is formed annularly or substantially annularly around the axis Y1. In a center of the gasket, an opening having an annular or substantially annular shape is formed. As illustrated in FIGS. 7 and 8, the gasket 1 includes the reinforcing ring 10 that is annular or substantially annular in shape around the axis Y1 and the elastic body part (the base 20 and the seal lip 21) that is formed from the elastic body integrally molded with the reinforcing ring 10 and that is annular or substantially annular in shape around the axis Y1.

In the gasket 1, the reinforcing ring 10 has an annular or substantially annular plate shape, extending parallel to or substantially parallel to the radial direction (the arrows cd direction). In a center of the reinforcing ring 10, an opening having an annular or substantially annular shape is formed. As illustrated in FIGS. 7 and 8, the reinforcing ring 10 is rectangular or substantially rectangular in cross-sectional view.

In the gasket 1, the elastic body part, as described above, includes the base 20 and the seal lip 21. The base 20 and the seal lip 21 each have an external shape that is formed annularly or substantially annularly around the axis Y1. In a center of the elastic body part, an opening having an annular or substantially annular shape is formed. The seal lip 21 includes the upper seal lip portion 22 formed annularly and the lower seal lip portion 23 formed annularly.

As illustrated in FIG. 7, the base 20 is square or substantially square in cross-sectional view. A thickness T1 of the base 20 in the axis Y1 direction (the arrows ab direction) is a thickness that is satisfactorily large as compared to a thickness T2 of the reinforcing ring 10 in the axis Y1 direction (the arrows ab direction). A width W1 that is a sum of the width of the base 20 in the radial direction (the arrows cd direction) and the width of the seal lip in the radial direction is greater than the thickness T1 of the base 20 in the axis Y1 direction (the arrows ab direction).

The reinforcing ring 10 is buried in a middle or substantially middle part of the base 20 in the axis Y1 direction (the arrows ab direction). In other words, a thickness T3 of a portion of the base 20 above (the arrow a direction) an upper surface 10a that is a surface on the upper side (the arrow a direction) of the reinforcing ring 10 is equal to or substantially equal to a thickness T4 of a portion of the base 20 below (the arrow b direction) a lower surface 10b that is a surface on the lower side (the arrow b direction) of the reinforcing ring 10.

An outer peripheral end portion that is an end portion on the outer periphery side (the arrow d direction) of the reinforcing ring 10 is buried in a part on the outer periphery side (the arrow d direction) of a middle part of the base 20 in the radial direction (the arrows cd direction). In other words, an outer peripheral surface 10d that is a surface on the outer periphery side (the arrow d direction) of the reinforcing ring 10 is disposed on the outer periphery side (the arrow d direction) of the middle part of the base 20 in the radial direction (the arrows cd direction).

The upper seal lip portion 22 extends from an upper surface 20a, a surface on the upper side (the arrow a direction) of the base 20, and an inner peripheral surface 21c, a surface on the inner periphery side (the arrow c direction) of the seal lip 21, to the inner periphery side (the arrow c direction) as progress toward the upper side (the arrow a direction). The lower seal lip portion 23 extends from a lower surface 20b, a surface on the lower side (the arrow b direction) of the base 20, and the inner peripheral surface 21c of the seal lip 21 to the inner periphery side (the arrow c direction) as progress toward the lower side (the arrow b direction).

A protrusion amount H1 of the upper seal lip portion 22 protruding to the upper side (the arrow a direction) is a protrusion amount equal to or substantially equal to a protrusion amount H2 of the lower seal lip portion 23 protruding to the lower side (the arrow b direction). A protrusion amount H3 of the upper seal lip portion 22 protruding to the inner periphery side (the arrow c direction) is a protrusion amount equal to or substantially equal to a protrusion amount H4 of the lower seal lip portion 23 protruding to the inner periphery side (the arrow c direction).

An upper surface 22a, a surface on the upper side (the arrow a direction) of the upper seal lip portion 22, is parallel to or substantially parallel to the upper surface 20a of the base 20 in the radial direction (the arrows cd direction). An inner peripheral surface 22c, a surface on the inner periphery side (the arrow c direction) of the upper seal lip portion 22, is parallel to or substantially parallel to the inner peripheral surface 21c of the seal lip 21 in the axis Y1 direction (the arrows ab direction).

A lower surface 23b, a surface on the lower side (the arrow b direction) of the lower seal lip portion 23, is parallel to or substantially parallel to the lower surface 20b of the base 20 in the radial direction (the arrows cd direction). An inner peripheral surface 23c, a surface on the inner periphery side (the arrow c direction) of the lower seal lip portion 23, is parallel to or substantially parallel to the inner peripheral surface 21c of the seal lip 21 in the axis Y1 direction (the arrows ab direction). A distal end portion 22t of the upper seal lip portion 22 and a distal end portion 23t of the lower seal lip portion 23 are each rounded.

A width W2 of the reinforcing ring 10 in the radial direction (the arrows cd direction) is a width substantially equal to a width W3 of the upper and lower seal lip portions 22 and 23 in the radial direction (the arrows cd direction). In other words, a distance from an inner peripheral surface 10c, a surface on the inner periphery side of the reinforcing ring 10, to the inner peripheral surface 21c of the seal lip is a distance that is satisfactorily large as compared to a distance from the outer peripheral surface 10d of the reinforcing ring 10 to an outer peripheral surface 20d, a surface on the outer periphery side (the arrow d direction) of the base 20.

In the base 20, reinforcing-ring hold-down holes 24a and 24b are formed in an upper end portion and a lower end portion of the base 20, respectively, to dispose the reinforcing ring 10 in the substantially middle part of the base 20 in the axis Y1 direction (the arrows ab direction). Specifically, in the upper surface 20a of the base 20, a plurality (e.g., four (FIG. 1)) of the reinforcing-ring hold-down holes 24a are formed at equal or substantially equal angle intervals in a common or substantially common circle centered at a center or a substantially center of the base 20. The reinforcing-ring hold-down holes 24a are formed so as to have a predetermined depth from the upper surface 20a of the base 20 to the lower side (in the arrow b direction).

In the lower surface 20b of the base 20, a plurality (e.g., four) of the reinforcing-ring hold-down holes 24b are formed at equal or substantially equal angle intervals in a common or substantially common circle centered at the center or the substantially center of the base 20. The reinforcing-ring hold-down holes 24b are formed so as to have a predetermined depth from the lower surface 20b of the base 20 to the upper side (in the arrow a direction). The reinforcing-ring hold-down holes 24b are formed at places that coincide or substantially coincide with places for the reinforcing-ring hold-down holes 24a in the axis Y1 direction (the arrows ab direction).

During manufacturing, reinforcing-ring hold-down parts (not illustrated) having a slender rod shape are, for example, inserted into the reinforcing-ring hold-down holes 24a and 24b to hold down the reinforcing ring 10 from the upper side (the arrow a direction) and the lower side (the arrow b direction, respectively. This enables disposition of the reinforcing ring 10 in the substantially middle part of the base 20 in the axis Y1 direction (the arrows ab direction).

The base 20 has an outer peripheral lip 25 protruding to the outer periphery side (the arrow d direction) from an outer peripheral area of the base 20 at the substantially middle part of the base 20 in the axis Y1 direction (the arrows ab direction). Specifically, a plurality (e.g., four (FIG. 1)) of the outer peripheral lips 25 are formed at equal or substantially equal angle intervals in a common or substantially common circle, extending from the outer peripheral surface 20d of the base 20 in a direction away from the center or the substantially center of the base 20 (to the outer periphery side (the arrow d direction)).

The outer peripheral lips 25 are formed in a middle or substantially middle part of the outer peripheral surface 20d of the base 20 in the axis Y1 direction (the arrows ab direction). As illustrated in FIG. 1, the outer peripheral lips 25 are formed at places that coincide or substantially coincide with places for the respective corresponding reinforcing-ring hold-down holes 24a and 24b in the radial direction (the arrows cd direction). The outer peripheral lips 25 each have a predetermined width in a direction of circumference of the base 20, and the widths of the outer peripheral lips 25 are equal or substantially equal to one another in the direction of circumference of the base 20.

In the outer peripheral surface 20d of the base 20, as illustrated in FIGS. 6 and 8, a plurality (e.g., four (FIG. 6)) of cuts 26 are formed at equal or substantially equal angle intervals in a common or substantially common circle centered at the center or the substantially center of the base 20. The cuts 26 extend parallel to or substantially parallel to the axis Y1 direction (the arrows ab direction) from the lower surface 20b of the base 20 toward the upper surface 20a so as to reach a level below the upper surface 20a of the base 20 in the axis Y1 direction (the arrows ab direction).

Each of the cuts 26 has an inner peripheral surface 26c that is a surface on the inner periphery side (the arrow c direction) of each of the cuts 26. The inner peripheral surface 26c of the cut 26 is a curved surface having a rectangular or substantially rectangular shape and protruding to the outer periphery side (the arrow d direction), exposing the outer peripheral surface 10d of the reinforcing ring 10. The inner peripheral surface 26c of the cut 26 is flush with the outer peripheral surface 10d of the reinforcing ring 10.

Each of the cuts 26 has side surfaces 26a that are surfaces in a circumferential direction of the cuts 26. Each of the side surfaces 26a of the cut 26 is a curved surface having a rectangular or substantially rectangular shape and protruding to the outer periphery side (the arrow d direction), smoothly joining the outer peripheral surface 20d of the base 20 to the inner peripheral surface 26c of the cut 26. The cuts 26 are formed at places that are displaced 45 degrees circumferentially with respect to the reinforcing-ring hold-down holes 24a and 24b and the outer peripheral lips 25 that the cuts 26 correspond to respectively in the radial direction (the arrows cd direction).

Figure 9:
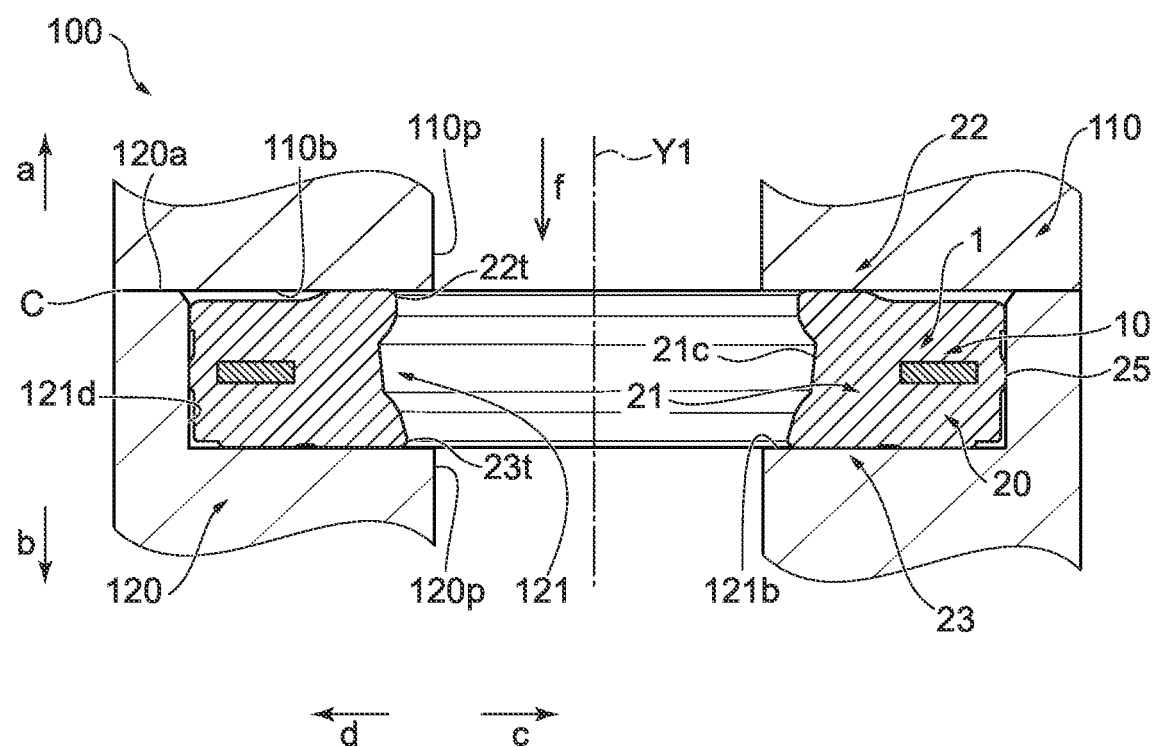
FIG. 9 is a cross-sectional view illustrating a gasket according to an embodiment of the present disclosure in a state of being installed between an upper member and a lower member of a sealed object

Next, an installation state in which the gasket 1 is installed in an object will be described. FIG. 9 is a cross-sectional view illustrating the gasket 1 according to the embodiment of the present disclosure in a state of being installed between an upper member 110 and a lower member 120 of a sealed object 100. The sealed object 100 includes the upper member 110, which is an upper-side (arrow a direction side) member of the sealed object 100, and the lower member 120, which is a lower-side (arrow b direction side) member of the sealed object 100.

The upper member 110 is disposed on the upper side (the arrow a direction) of the gasket 1 and has a through-hole 110p. A diameter of the through-hole 110p is smaller than a diameter of the opening in the gasket 1. The through-hole 110p in the upper member 110 and the opening in the gasket 1 are coaxial or substantially coaxial holes with respect to the axis Y1.

The lower member 120 is disposed on the lower side (the arrow b direction) of the gasket 1 and has a through-hole 120p. A diameter of the through-hole 120p is smaller than the diameter of the opening in the gasket 1. The through-hole 120p in the lower member 120 and the opening in the gasket 1 are coaxial or substantially coaxial holes with respect to the axis Y1.

The diameter of the through-hole 120p in the lower member 120 is equal to or substantially equal to the diameter of the through-hole 110p in the upper member 110. The through-hole 120p in the lower member 120 and the through-hole 110p in the upper member 110 are coaxial or substantially coaxial holes with respect to the axis Y1, forming a flow path f.

The lower member 120 has an accommodating part 121 to accommodate the gasket 1. The accommodating part 121 is recessed downward (the arrow b direction) from an upper surface 120a, a surface on the upper side (the arrow a direction) of the lower member 120.

As illustrated in FIG. 9, when the gasket 1 is accommodated in the accommodating part 121 of the lower member 120, the upper member 110 is disposed on the upper side (the arrow a direction) of the gasket 1, and the lower member 120 and the upper member 110 are fastened with bolts or other fasteners (not illustrated), the gasket 1 is pressed by the upper member 110 and a compressive force is applied to the upper seal lip portion 22 and the lower seal lip portion 23 in the axis direction (the arrows ab direction).

Consequently, the upper seal lip portion 22 and the lower seal lip portion 23 deform and stretch to the inner periphery side (the arrow c direction). Since the distal end portions 22t, 23t are rounded, the upper seal lip portion 22 and the lower seal lip portion 23 readily stretch to the inner periphery side (the arrow c direction).

After that, when the upper surface 20a of the base 20 is in contact with or close to a lower surface 110b that is a surface on the lower side (the arrow b direction) of the upper member 110, the upper seal lip portion 22 stops stretching to the inner periphery side (the arrow c direction). When the lower surface 20b of the base 20 is in contact with or close to a lower surface 121b that is a surface on the lower side (the arrow b direction) of the accommodating part 121 of the lower member 120, the lower seal lip portion 23 stops stretching to the inner periphery side (the arrow c direction).

After that, when the lower member 120 and the upper member 110 are completely fastened with bolts or other fasteners (not illustrated), the upper seal lip portion 22 is in close contact with the lower surface 110b of the upper member 110 and the lower seal lip portion 23 is in close contact with the lower surface 121b of the accommodating part 121 of the lower member 120. The gasket thereby seals a gap C between the upper member 110 and the lower member 120 of the sealed object 100.

A distance from the axis Y1 of the gasket 1 to an outer peripheral end portion, an end portion on the outer periphery side (the arrow d direction) of each of the outer peripheral lips 25 of the base 20 is slightly greater than a distance from the axis Y1 of the gasket 1 to an outer peripheral surface 121d, a surface on the outer periphery side (the arrow d direction) of the accommodating part 121 of the lower member 120. Thus, the outer peripheral lips 25 are in close contact with the outer peripheral surface 121d of the accommodating part 121 of the lower member 120 while the gasket 1 is accommodated in the accommodating part 121 of the lower member 120.

In this way, in the gasket 1 according to the embodiment of the present disclosure, the upper seal lip portion 22 extends from the upper end portion of the base 20 to the inner periphery side (the arrow c direction) as progress toward the upper side (the arrow a direction)) in the axis Y1 direction (the arrows ab direction). The lower seal lip portion 23 extends from the lower end portion of the base 20 to the inner periphery side (the arrow c direction) as progress toward the lower side (the arrow b direction) in the axis Y1 direction (the arrows ab direction).

The thickness T1 of the base 20 in the axis Y1 direction (the arrows ab direction) is a thickness that is satisfactorily large as compared to the thickness T2 of the reinforcing ring 10 in the axis Y1 direction (the arrows ab direction). The width W1, which is a sum of the width of the base 20 in the radial direction (the arrows cd direction) and the width of the seal lip in the radial direction, is greater than the thickness T1 of the base 20 in the axis Y1 direction (the arrows ab direction).

Hence, the gasket 1, which ensures the thickness T1 of the base 20 in the axis Y1 direction (the arrows ab direction), is able to reduce a degree of variation in width by which the gasket 1 is compressed due to the thickness T1 of the base 20 in the axis Y1 direction (the arrows ab direction), even when the variation in width by which the gasket 1 is compressed increases for a reason such as a large tolerance for a depth of the accommodating part 121 designed for the gasket 1 between the upper member 110 and the lower member 120 of the sealed object 100. As a result, the gasket 1 according to the embodiment of the present disclosure can display further improved durability even in a case of excessive compression and display satisfactory sealing performance even in a case of inadequate compression.

The width W1, which is a sum of the width of the base 20 in the radial direction (the arrows cd direction) and the width of the seal lip in the radial direction, is greater than the thickness T1 of the base 20 in the axis Y1 direction (the arrows ab direction). This inhibits distortion of a position of the gasket 1 caused by compression and enables the gasket 1 to display satisfactory sealing performance.

In the gasket 1, the width W2 of the reinforcing ring 10 in the radial direction (the arrows cd direction) is a width substantially equal to the width W3 of the upper and lower seal lip portions 22 and 23 in the radial direction (the arrows cd direction). This ensures satisfactory distance from the inner peripheral surface 10c of the reinforcing ring 10 to the upper and lower seal lip portions 22 and 23. This configuration prevents the gasket 1 from being damaged by an edge of the reinforcing ring 10 in response to a distortion of the position of the gasket 1 caused by compression even if the reinforcing ring 10 is an inexpensive reinforcing ring 10 that has not been processed by barrel polishing or other finishing. As a result, the gasket 1 can display further improved durability.

In the gasket 1, the reinforcing ring 10 is buried in the middle or substantially middle part of the base 20 in a direction of thickness of the base 20 (the axis Y1 direction (the arrows ab direction)). As a result, the thickness T3 of a portion of the base 20 above (the arrow a direction) the upper surface 10a of the reinforcing ring 10 is equal to or substantially equal to the thickness T4 of a portion of the base 20 below (the arrow b direction) the lower surface 10b of the reinforcing ring 10. This configuration ensures uniform stiffness in the axis Y1 direction (the arrows ab direction), inhibits distortion of the position of the gasket 1 caused by compression, and enables the gasket 1 to display satisfactory sealing performance.

In the gasket 1, the base 20 has the outer peripheral lips 25 protruding to the outer periphery side (the arrow d direction) from the outer peripheral area of the base 20 that is at the substantially middle part of the base 20 in the axis Y1 direction (the arrows ab direction). The distance from the axis Y1 of the gasket 1 to the outer peripheral end portion of the base 20 is slightly greater than the distance from the axis Y1 of the gasket 1 to the outer peripheral surface 121d of the accommodating part 121 of the lower member 120. This prevents the gasket from coming off during installation and contributes to improved workability in installation. This also inhibits the gasket 1 from being displaced in a width direction (the arrows cd direction) even if the gasket 1 receives high fluid pressure from a fluid flowing through the flow path f.

Although the preferred embodiment of the present disclosure has been described above, the present disclosure is not limited to the embodiment, and includes any modes falling within the scope of the concept and claims of the present disclosure. Respective configurations may be appropriately selectively combined to solve at least part of the above-described problems and achieve at least part of the above-described effects. For example, in the above-described embodiment, the shape, material, arrangement, size and the like of each component can be appropriately changed according to a specific use mode of the present disclosure.

An embodiment of the present disclosure has been described by taking an instance in which in the gasket 1 according to the embodiment of the present disclosure, the reinforcing ring 10 is buried in the middle or substantially middle part of the base 20 in the axis Y1 direction (the arrows ab direction). However, the present disclosure is not limited to this instance. The reinforcing ring 10 may be buried in a part above (the arrow a direction) or below (the arrow b direction) the middle part of the base 20 in the axis Y1 direction (the arrows ab direction).

An embodiment of the present disclosure has been described by taking an instance in which in the gasket 1 according to the embodiment of the present disclosure, the outer peripheral end portion of the reinforcing ring 10 is buried in a part on the outer periphery side (the arrow d direction) of the middle part of the base 20 in the radial direction (the arrows cd direction). However, the present disclosure is not limited to this instance. The outer peripheral end portion of the reinforcing ring 10 may be buried in a vicinity of the middle part of or in a part on the inner periphery side (the arrow c direction) of the middle part of the base 20 in the radial direction (the arrows cd direction).

An embodiment of the present disclosure has been described by taking an instance in which in the gasket 1 according to the embodiment of the present disclosure, the base 20 has the outer peripheral lips 25 protruding to the outer periphery side (the arrow d direction) from the outer peripheral area of the base 20 that is at the substantially middle part of the base 20 in the axis Y1 direction (the arrows ab direction). However, the present disclosure is not limited to this instance. The outer peripheral lips 25 may be formed at any position that is above (the arrow a direction) or below (the arrow b direction) the middle part of the base 20 in the axis Y1 direction (the arrows ab direction). A number of the outer peripheral lips 25 that the base has may be one or more other than the four. The base may not have any outer peripheral lip 25.

An embodiment of the present disclosure has been described by taking an instance in which in the outer peripheral surface 20d of the base 20 of the gasket 1 according to the embodiment of the present disclosure, a plurality (e.g., four) of the cuts 26 are formed at equal or substantially equal angle intervals in a common or substantially common circle centered at the center or the substantially center of the base 20. However, the present disclosure is not limited to this instance. The cuts 26 may be formed at any places in the outer peripheral surface 20d of the base 20. A number of the cuts 26 that the base has may be one or more other than the four. The base may not have any cut 26.

The invention claimed is:
1. A gasket including:
an annular reinforcing ring having a plate shape and formed around an axis, wherein
the plate shape of the annular reinforcing ring extends parallel to a radial direction of the gasket;
an annular base that is formed around the axis and that is formed from an elastic body into which the annular reinforcing ring is embedded; and
an annular seal lip formed around the axis, the annular seal lip being disposed on an inner periphery side of the annular base and being integrated with the annular base,
wherein the annular seal lip includes one seal lip portion extending to the inner periphery side as progress toward one side in a direction of the axis and another seal lip portion extending to the inner periphery side as progress toward another side in the direction of the axis,
wherein a sum of a width of the annular base in the radial direction and a width of the annular seal lip in the radial direction is greater than a thickness of the annular base in the direction of the axis,
wherein a surface of the one seal lip portion on the one side includes an inclined part extending to the inner periphery side as progress toward the one side and a part extending along the radial direction continuous to the inner peripheral side of the inclined part,
wherein a surface of the another seal lip portion on the another side includes an inclined part extending to the inner periphery side as progress toward the another side and a part extending along the radial direction,
wherein an entire inner peripheral surface of the annular seal lip, which is located between the one seal lip portion and the another seal lip portion, is located closer to the axis in the radial direction than the entire inclined part of the one seal lip portion and the entire inclined part of the another seal lip portion, and
wherein the one seal lip portion and the another lip portion deform and stretch to the inner periphery side due to a compressive force applied to the one seal lip portion and the another lip portion in the direction of the axis.
2. The gasket according to claim 1, wherein a width of the annular reinforcing ring in the radial direction is a width equal to the width of the annular seal lip in the radial direction.

3. The gasket according to claim 1, wherein the annular reinforcing ring is buried in a middle part of the annular base in the direction of the axis.

4. The gasket according to claim 3, wherein a reinforcing-ring hold-down hole is formed in the annular base to dispose the annular reinforcing ring in the middle part of the annular base in the direction of the axis.

5. The gasket according to claim 1, wherein the annular base has at least one outer peripheral lip protruding to an outer periphery side from an outer peripheral area of the annular base at the middle part of the annular base in the direction of the axis so as to coincide with the annular reinforcing ring in the axial direction.

6. A gasket including:
- an annular reinforcing ring having a plate shape and formed around an axis,
- the plate shape of the annular reinforcing ring extends parallel to a radial direction of the gasket;
- an annular base that is formed around the axis and that is formed from an elastic body into which the annular reinforcing ring is embedded; and
- an annular seal lip formed around the axis, the annular seal lip being disposed on an inner periphery side of the annular base and being integrated with the annular base,
- wherein the annular seal lip includes one seal lip portion extending to the inner periphery side as progress toward one side in a direction of the axis and another seal lip portion extending to the inner periphery side as progress toward another side in the direction of the axis,
- wherein an inner peripheral surface of the annular seal lip located between the one seal lip portion and the another seal lip portion extends parallel to the direction of the axis,
- wherein a sum of a width of the annular base in the radial direction and a width of the annular seal lip in the radial direction is greater than a thickness of the annular base in the direction of the axis,
- wherein the one seal lip portion and the another lip portion deform and stretch to the inner periphery side due to a compressive force applied to the one seal lip portion and the another lip portion in the direction of the axis, and
- wherein a width of the annular reinforcing ring in the radial direction is a width equal to the width of the annular seal lip in the radial direction.

7. The gasket according to claim 6, wherein the annular reinforcing ring is buried in a middle part of the annular base in the direction of the axis.

8. The gasket according to claim 6, wherein the annular base has at least one outer peripheral lip protruding to an outer periphery side from an outer peripheral area of the annular base at the middle part of the annular base in the direction of the axis so as to coincide with the annular reinforcing ring in the axial direction.

* * * * *